(12) United States Patent
DeLuca (10) Patent No.: US 7,194,533 B1
(45) Date of Patent: Mar. 20, 2007

(54) SYSTEM AND METHOD FOR EDITING ACTIVE MEASUREMENTS IN A CLIENT MANAGEMENT TOOL

(75) Inventor: Steve A. DeLuca, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/561,442

(22) Filed: Apr. 28, 2000

(51) Int. Cl.
G06F 15/173 (2006.01)
G06F 15/16 (2006.01)

(52) U.S. Cl. .................................... 709/224; 709/207
(58) Field of Classification Search ............... 709/217, 709/220, 226, 223–224, 204, 205, 206, 225; 700/108; 710/19
See application file for complete search history.

(56) References Cited

U.S. PATENT DOCUMENTS

| | | | | |
|---|---|---|---|---|
| 5,261,044 A * | 11/1993 | Dev et al. | ................ | 715/855 |
| 5,689,645 A * | 11/1997 | Schettler et al. | ................ | 709/226 |
| 5,787,252 A * | 7/1998 | Schettler et al. | ................ | 709/224 |
| 5,808,617 A | 9/1998 | Kenworthy et al. | ................ | 345/321 |
| 5,832,503 A * | 11/1998 | Malik et al. | ................ | 709/223 |
| 5,848,270 A | 12/1998 | DeLuca et al. | ................ | 395/675 |
| 5,852,443 A | 12/1998 | Kenworthy | ................ | 345/431 |
| 5,867,166 A | 2/1999 | Myhrvold et al. | ................ | 345/419 |
| 5,870,097 A | 2/1999 | Snyder et al. | ................ | 345/426 |
| 5,875,119 A * | 2/1999 | Bauman et al. | ................ | 702/181 |
| 5,880,737 A | 3/1999 | Griffin et al. | ................ | 345/430 |
| 5,886,701 A | 3/1999 | Chauvin et al. | ................ | 345/418 |
| 5,949,428 A | 9/1999 | Toelle et al. | ................ | 345/431 |
| 5,958,012 A | 9/1999 | Battat et al. | | |
| 5,964,837 A | 10/1999 | Chao et al. | | |
| 5,977,977 A | 11/1999 | Kajiya et al. | ................ | 345/418 |
| 5,990,904 A | 11/1999 | Griffin | ................ | 345/435 |
| 5,999,189 A | 12/1999 | Kajiya et al. | ................ | 345/430 |
| 6,005,582 A | 12/1999 | Gabriel et al. | ................ | 345/430 |
| 6,008,820 A | 12/1999 | Chauvin et al. | ................ | 345/502 |
| 6,112,237 A * | 8/2000 | Donaldson et al. | ................ | 709/224 |
| 6,266,694 B1 * | 7/2001 | Duguay et al. | ................ | 709/223 |
| 6,374,293 B1 * | 4/2002 | Dev et al. | ................ | 709/220 |
| 6,430,609 B1 * | 8/2002 | Dewhurst et al. | ................ | 709/220 |
| 6,490,716 B1 * | 12/2002 | Gupta et al. | ................ | 716/18 |
| 6,505,248 B1 * | 1/2003 | Casper et al. | ................ | 709/224 |
| 6,539,422 B1 * | 3/2003 | Hunt et al. | ................ | 709/217 |
| 6,556,875 B1 * | 4/2003 | Nagasaka et al. | ................ | 700/19 |

FOREIGN PATENT DOCUMENTS

WO WO 00/17763 A1 3/2000

OTHER PUBLICATIONS

Chapter 7; Using SQL Server Profiler, pp. 113-143.
Chapter 9; Sizing the Database and Application Servers, pp. 161-175.
European Search Report dated Oct. 24, 2006 for corresponding European Application No. 01110319.9-2212.

* cited by examiner

Primary Examiner—Paul H. Kang
(74) Attorney, Agent, or Firm—Shook, Hardy & Bacon LLP (57) ABSTRACT

A system and method for editing active measurements in a client management tool are provided. One or more clients in a computer network measure a variety of attributes associated with the function of the client. A monitor process establishes and collects a subset of the client attributes to measure for client management. Without terminating the collection of the initial subset of client attributes, the monitor process establishes and begins collecting a modified subset of client attributes.

19 Claims, 11 Drawing Sheets

SYSTEM AND METHOD FOR EDITING ACTIVE MEASUREMENTS IN A CLIENT MANAGEMENT TOOL

FIELD OF THE INVENTION

The present invention relates generally to computer software and, more particularly, to a client management product for a computer system.

BACKGROUND OF THE INVENTION

Generally, it is desirable to utilize client management products, such as capacity planning products, to proactively monitor one or more client machines, especially in large enterprise configurations utilizing multiple machines dedicated to specific functions within the network. For example, a capacity planning product can determine when an existing server system will reach or exceed the limits of its hardware. In comparison, a sizing product, unlike a capacity planning product, involves a determination of the hardware investment needed to create a new computer system. Other client management products (namely, performance monitoring products) are used to monitor the performance of computer networks and systems. Such performance monitoring products provide real-time monitoring of performance thresholds.

Traditionally, capacity planning products and performance monitoring products are implemented separately. However, running simultaneously, those products can generate significant levels of administrative traffic on a network. Additionally, the system administrator must monitor two distinct client data gathering programs. This is especially inefficient if both are utilizing the same data from the client to implement their function. Accordingly, there is a need for a product which integrates the functions of capacity planning and performance monitoring into a single client management product which more efficiently utilizes system resources.

Existing client management products sometimes utilize polling agents to collect data from a computer network and its components. One approach is to provide a central polling agent which issues data requests for client data (e.g., capacity planning or performance monitoring data) from a number of network machines at given intervals. An alternative approach is to provide a number of resident polling agents which reside on the network machines and which are responsible for transmission of client data to a central database at similar given intervals. Some network administrators prefer the central polling agent configuration because it does not require the system administrator to load and maintain polling software on each client. Other network administrators prefer to use resident polling agents because it reduces the amount of network traffic relating to the collection of capacity planning data. Currently, a network administrator typically implements one polling agent configuration without the ability to change the configuration as management needs vary. Given the demand for both approaches, there is a need for a client management product which allows a user such as a network administrator to select from multiple polling functions or modes, including a central polling function and a resident polling function.

Client management data, such as capacity planning data, is obtained for a given client by taking a number of measurements involving various system components. Some operating systems provide functions which measure and transmit various system parameters. For example, several operating system vendors support the Web-Based Enterprise Management (WBEM) standardized format for accessing and sharing management information. Counters, which are stored values that are incremented every time an event occurs, or after a measurement interval has been obtained, are often used to measure memory usage or CPU (central processing unit) usage on individual machines and to monitor utilization or "busy time" for links. Historical information from counters can be used for a number of purposes, including the identification of bottlenecks in performance (such as extensive disk queue lengths), the detection of periods of peak usage and the prediction of future usage. A measurement typically involves a grouping or selection of multiple counters or other such devices.

Conventionally, an active measurement is initiated by a monitoring process that identifies which measurements should be produced by the client. However, once initiated, the measurement cannot be modified except by deactivating it, making the modification and then reactivating it. This causes a discontinuity in the collection of client management data and can result in the loss of valuable information while the measurement remains inactive. Moreover, substantial user intervention may be required to complete the modification. Consequently, there is a need for a client management product which provides the ability to modify an active measurement without deactivating it.

Because separate client management products have been used to collect capacity planning data and performance monitoring data, the data obtained from active measurements is typically forwarded to separate databases at a central location without first being stored in the client's cache or other local memory. Capacity planning data is usually not cached because it is collected infrequently and would consume the client's cache or be overwritten by other data. Performance monitoring data is typically not cached because it is critical data which should be monitored frequently. However, if the performance data were stored locally and averaged over a period of time, it would provide more accurate capacity planning data because it would be based on an increased number of data points. Accordingly, there is a need for a client management product which stores performance data locally and averages it over a period of time so that more accurate capacity planning data is provided to the central location.

Many service transactions are under a "service level agreement" (SLA), which is a contract between the provider of computer or database services and user of those services. The SLA specifies the minimal level of service that is guaranteed and usually is in the form of maximum response times for certain transaction. Violations of an SLA is likely to occur if no measures are taken to anticipate potential violations. Accordingly, a capacity planning product can be utilized to anticipate system needs with respect to SLAs.

In addition to SLAs, service transactions may be subject to other time constraints, and it would be advantageous to monitor the response time in a service chain, for example, to determine in advance whether the time constraints will likely be met. A "service chain" is a collection of resources that are used in the processing of a transaction or service. Because of the real-time need for monitoring, a separate performance monitoring product would also need to be utilized. The substantial deficiencies associated with concurrently running two client management products evidences a need for a client management product which can monitor multiple aspects of individual service transactions in a computer system by identifying and monitoring the specific system resources involved.

It is oftentimes desirable to archive capacity planning and performance monitoring data. Although archiving requires substantial memory, substantial resources were expended to collect the data in the first place and the archived data may be valuable for predictive analysis and for generating reports based on detailed historical data to justify an expensive upgrade. Traditionally, the archiving of capacity planning data cannot be carried out within the client management tool itself. Instead, a conventional method of archiving must be used, which must be carried out utilizing software applications outside of the client management tool and which typically requires the expertise of a database specialist. Thus, there is a need for a client management product which performs both a client management function, such as capacity planning, and an archiving function without the need for a database specialist.

Generally, conventional management tools (e.g., capacity planning or performance monitoring tools) store data collected from one or more clients into database files. However, depending on the management tool selected and the provider of the management tool, the data can be organized under a variety of database column headings, which are often proprietary in nature. For example, a first database file may have a column heading entitled "Machine Name" to represent the specific identity of a server while a second database file may utilize the column heading "Computer Name" to represent the same information. Accordingly, data collected via different management tools and/or different tool providers may be incompatible because of inconsistencies in the data schema. Thus, there is a need for a management tool that can read and/or convert previously collected management data.

Additionally, because none of the conventional management tools are used for both capacity planning and performance monitoring, the collected data is saved in variable length files, known as a log file, whose length cannot be adjusted, or added to, once the measurement is closed. For example, Microsoft Corporation provides a PERFMON performance monitoring function in its WINDOWS NT brand operating system. Typically, PERFMON can save the collected data into an EXCEL spreadsheet format, which is unique to Microsoft products. However, once a PERFMON measurement is stopped, a reactivation of the same measurement criteria instigates the creation of a second log file having the same name. Currently, there is no method, absent saving the contents of the two separate files to a third file, for storing additional management data on the original file. Thus, there is a need for a management tool that can store multiple measurement data within the same measurement file.

Another drawback to conventional capacity planners is their user interface (UI), which typically requires a highly trained system administrator or system manager. For example, many conventional UIs do not allow a user to manipulate the system in a graphical form, relying on generally more difficult command-based interfaces. Moreover, the UIs generally entail multiple screen interfaces to carry out a single function of the management system. These aspects of a conventional UI require more system administrator training and thus increase the costs associated with a capacity planner. Accordingly, there is also a need for a capacity planning product having a more intuitive UI which reduces the costs associated with the product because less training is required for the system administrator.

SUMMARY OF THE INVENTION

Generally described, a method in a computer system for measuring one or more client attributes is provided. In accordance with the method, a measurement of the client attributes is initiated. A subset of the client attributes is established and collected. Without terminating the client measurement, a modified subset of the client attributes is established and collected.

In another aspect of the present invention, a method of communicating between a monitor process and a client process. In accordance with the method, a monitor process issues a first set of data indicative of client attributes to be measured. The client process receives the first set of data and measures attributes responsive to the first set of data. The monitor process issues a second set of data indicative of a replacement set of client attributes to be measured. The client process receives the second set of data and measures attributes responsive to the second set of data.

In a further aspect of the present invention, a method for editing the measurement of one or more client process attributes is provided. A first set of client process attributes to be collected is generated and transmitted to the client process. Additionally, a second set of client attributes to be collected to replace the first set of client attributes is generated and seamlessly replaces the first set of client attributes with the second set of client attributes.

A system and method for editing active measurements in a client management tool are provided. One or more clients in a computer network measure a variety of attributes associated with the function of the client. A monitor process establishes and collects a subset of the client attributes to measure for client management. Without terminating the collection of the initial subset of client attributes, the monitor process establishes and begins collecting a modified subset of client attributes.

BRIEF DESCRIPTION OF THE SEVERAL VIEWS OF THE DRAWING

The present invention is described in detail below with reference to the attached drawing figures, wherein.

DETAILED DESCRIPTION OF THE INVENTION

Figure 1:
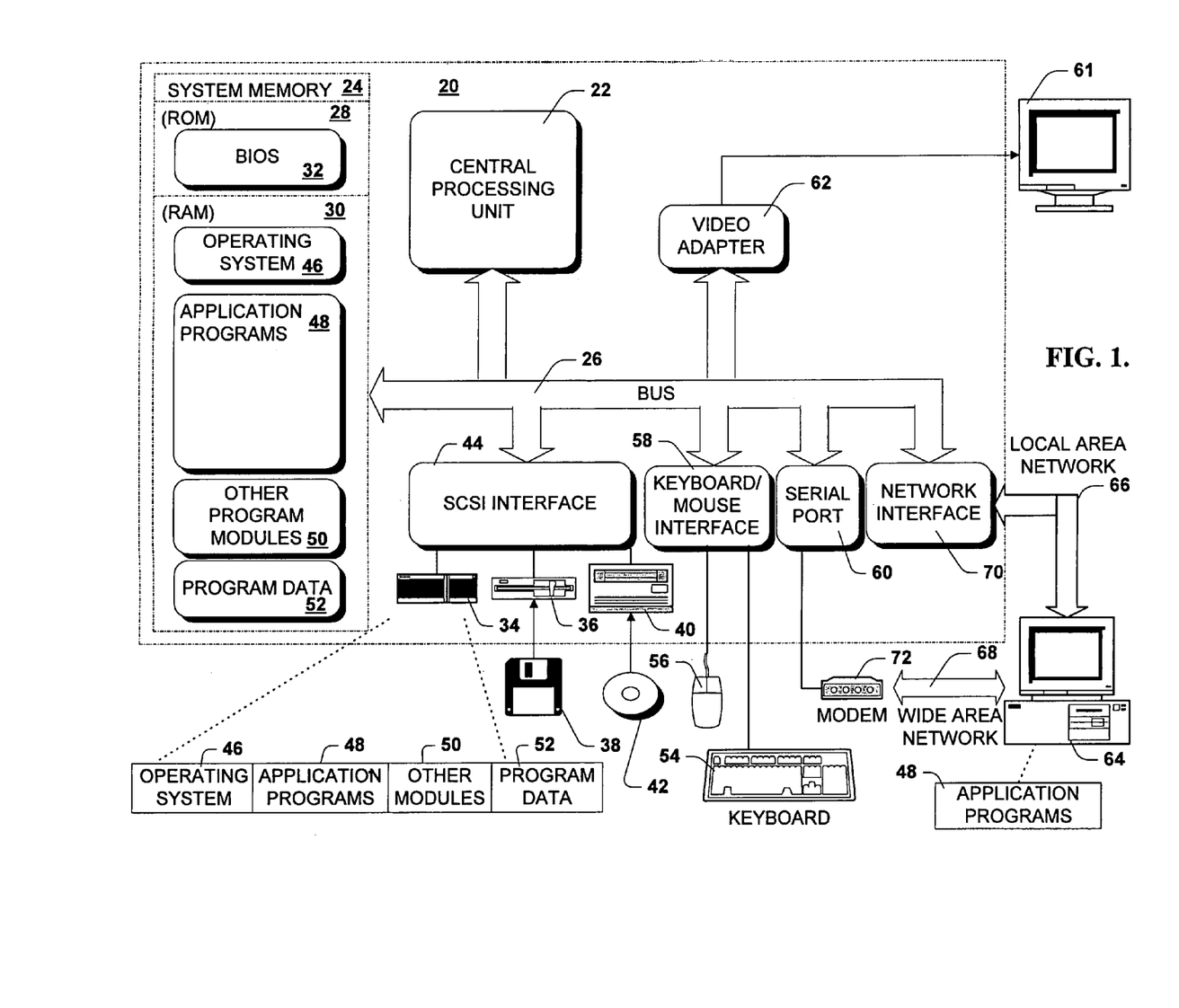
FIG. 1 is a block diagram of a computing system environment suitable for use in implementing the present invention.

FIG. 1 illustrates an example of a suitable computing system environment in which the invention may be implemented. The computing system environment is only one example of a suitable computing environment and is not intended to suggest any limitation as to the scope of use or functionality of the invention. Neither should the computing environment be interpreted as having any dependency or requirement relating to any one or combination of components illustrated in the exemplary operating environment.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 20. Components of computer 20 include, but are not limited to, a processing unit 22, a system memory 24, and a system bus 26 that couples various system components including the system memory to the processing unit 22. The system bus 26 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 20 typically includes a variety of computer readable media. Computer readable media can be any available media that can be accessed by computer 20 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 20. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer readable media.

The system memory 24 includes computer storage media in the form of volatile and/or nonvolatile memory such as read only memory (ROM) 28 and random access memory (RAM) 30. A basic input/output system 32 (BIOS), containing the basic routines that help to transfer information between elements within computer 20, such as during start-up, is typically stored in ROM 28. RAM 30 typically contains data and/or program modules that are immediately accessible to and/or presently being operated on by processing unit 22. By way of example, and not limitation, FIG. 1 illustrates operating system 46, application programs 48, other program modules 50, and program data 52.

The computer 20 may also include other removable/non-removable, volatile/nonvolatile computer storage media. By way of example only, FIG. 1 illustrates a hard disk drive 34 that reads from or writes to non-removable, nonvolatile magnetic media, a magnetic disk drive 36 that reads from or writes to removable, nonvolatile magnetic disk 38, and an optical disk drive 40 that reads from or writes to a removable, nonvolatile optical disk 42 such as a CD ROM or other optical media. Other removable/non-removable, volatile/nonvolatile computer storage media that can be used in the exemplary operating environment include, but are not limited to, magnetic tape cassettes, flash memory cards, digital video disks, digital video tape, Bernoulli cartridges, solid state RAM, solid state ROM, and the like. The hard disk drive 34, magnetic disk drive 36, and optical disk drive 40 are typically connected to the system bus 26 by a Small Computer System Interface (SCSI) 44. Alternatively, the hard disk drive 34, magnetic disk drive 36 and optical disk drive 40 may be connected to the system bus 26 by a hard disk drive interface, a magnetic disk drive interface, and an optical drive interface, respectively.

The drives and their associated computer storage media discussed above and illustrated in FIG. 1, provide storage of computer readable instructions, data structures, program modules and other data for the computer 20. In FIG. 1, for example, hard disk drive 34 is illustrated as storing operating system 46, application programs 48, other program modules 50, and program data 52. Note that these components can either be the same as or different from operating system 46, application programs 48, other program modules 50, and program data 52. A user may enter commands and information into the computer 20 through input devices such as a keyboard 54 and pointing device 56, commonly referred to as a mouse, trackball or touch pad. Other input devices (not shown) may include a microphone, joystick, game pad, satellite dish, scanner, or the like. These and other input devices are often connected to the processing unit 22 through a user input interface 58 or a serial port interface 60 that is coupled to the system bus, but may be connected by other interface and bus structures, such as a parallel port, game port or a universal serial bus (USB). A monitor 61 or other type of display device is also connected to the system bus 26 via an interface, such as a video adapter 62. In addition to the monitor 61, computers may also include other peripheral output devices such as speakers and printers, which may be connected through an output peripheral interface.

The computer 20 may operate in a networked environment using logical connections to one or more remote computers, such as a remote computer 64. The remote computer 64 may be a personal computer, a server, a router, a network PC, a peer device or other common network node, and typically includes many or all of the elements described above relative to the computer 20, although only a memory storage device has been illustrated in FIG. 1. The logical connections depicted in FIG. 1 include a local area network (LAN) 66 and a wide area network (WAN) 68, but may also include other networks. Such networking environments are commonplace in offices, enterprise-wide computer networks, intranets and the Internet.

When used in a LAN networking environment, the computer 20 is connected to the LAN 66 through a network interface or adapter 70. When used in a WAN networking environment, the computer 20 typically includes a modem 72 or other means for establishing communications over the WAN 68, such as the Internet. The modem 72, which may be internal or external, may be connected to the system bus 26 via the serial port interface 60 or other appropriate mechanism. In a networked environment, program modules depicted relative to the computer 20, or portions thereof, may be stored in the remote memory storage device. By way of example, and not limitation, FIG. 1 illustrates remote application programs 48 as residing on memory device 64. It will be appreciated that the network connections shown are exemplary and other means of establishing a communications link between the computers may be used.

Although many other internal components of the computer 20 are not shown, those of ordinary skill in the art will appreciate that such components and the interconnection are well known. Accordingly, additional details concerning the internal construction of the computer 20 need not be disclosed in connection with the present invention.

Those skilled in the art will understand that program modules such as the operating system 46, application programs 48 and data 52 are provided to the computer 20 via one of its memory storage devices, which may include ROM 28, RAM 30, hard disk drive 34, magnetic disk drive 36 or optical disk drive 40. Preferably, the hard disk drive 34 is used to store data 52 and programs, including the operating system 46 and application programs 48.

When the computer 20 is turned on or reset, the BIOS 32, which is stored in the ROM 28 instructs the processing unit 22 to load the operating system from the hard disk drive 34 into the RAM 30. Once the operating system 46 is loaded in RAM 30, the processing unit 22 executes the operating system code and causes the visual elements associated with the user interface of the operating system 46 to be displayed on the monitor 61. When an application program 48 is opened by a user, the program code and relevant data are read from the hard disk drive 34 and stored in RAM 30.

Figures 2, 3:
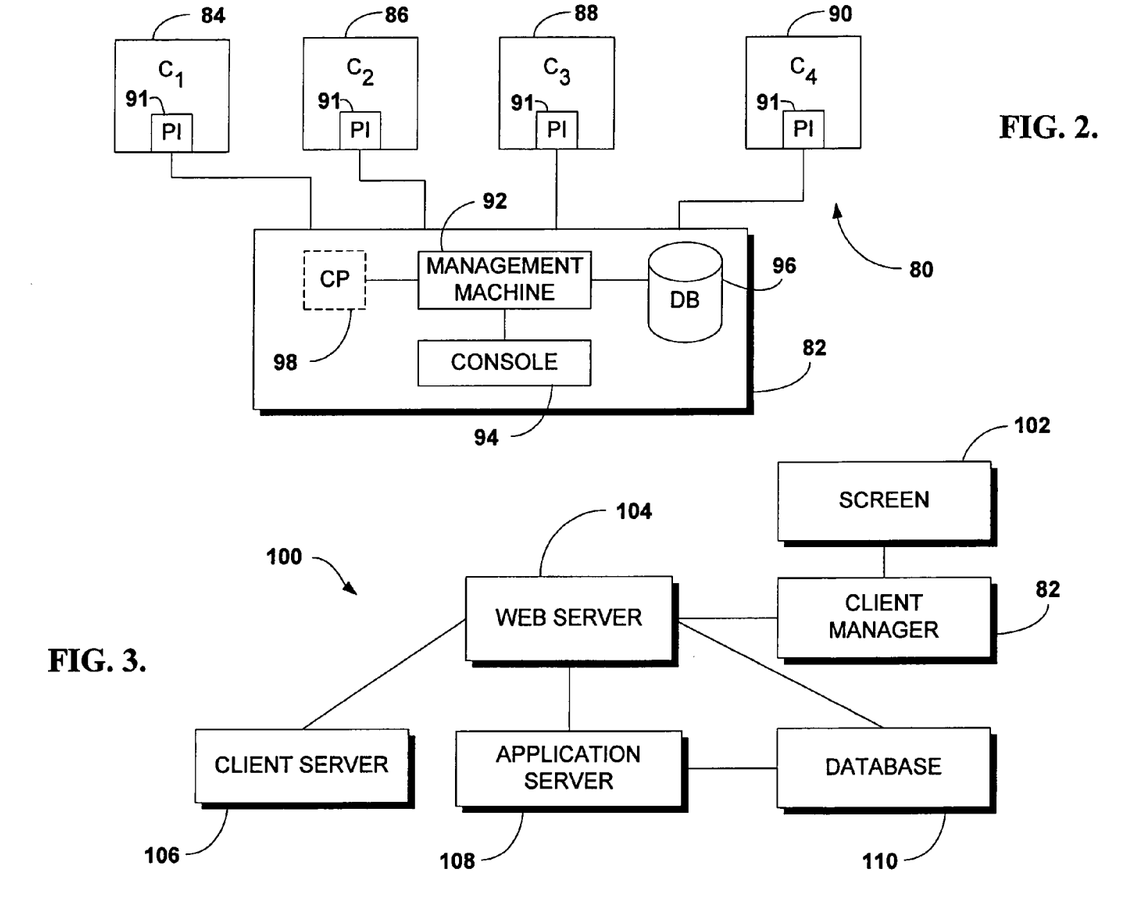
FIG. 2 is a block diagram of a computer system including a plurality of clients and a central manager suitable for implementing a preferred embodiment of the present invention.
FIG. 3 is a block diagram of an exemplary Web-based computer system for implementing the present invention.

With reference to FIG. 2, an exemplary computer system 80 includes a central manager 82 connected to a plurality of clients 84, 86, 88 and 90 over a plurality of corresponding communications links. Each of the clients 84–90 has a polling interface (PI) 91 which is the communications interface between that client and the central manager 82 and which is preferably the access point for the management information. Additionally, the PI 91 may include additional components which process and request client data. The central manager 82 includes a management machine 92, a console 94, a database 96 and a central polling agent 98. Although shown separately in FIG. 2, the agent 98 may instead reside on the machine 92, the console 94 or the database 96.

The clients 84–90 are preferably servers which have dedicated functions within a larger enterprise network. Such a network 100 is shown in FIG. 3. In the network 100, the client manager 82 is connected to an activity screen 102 and is also connected to a web server 104. The web server 104 is in turn connected to a client server 106, an application server 108 and a database server 110. The application server 108 and the database server 110 are also in communication with one another. As would be understood by those skilled in the art, the present invention contemplates that the clients 84–90 (FIG. 2) may include multi-purpose servers, servers from different networks and/or non-server computers.

Figure 11:
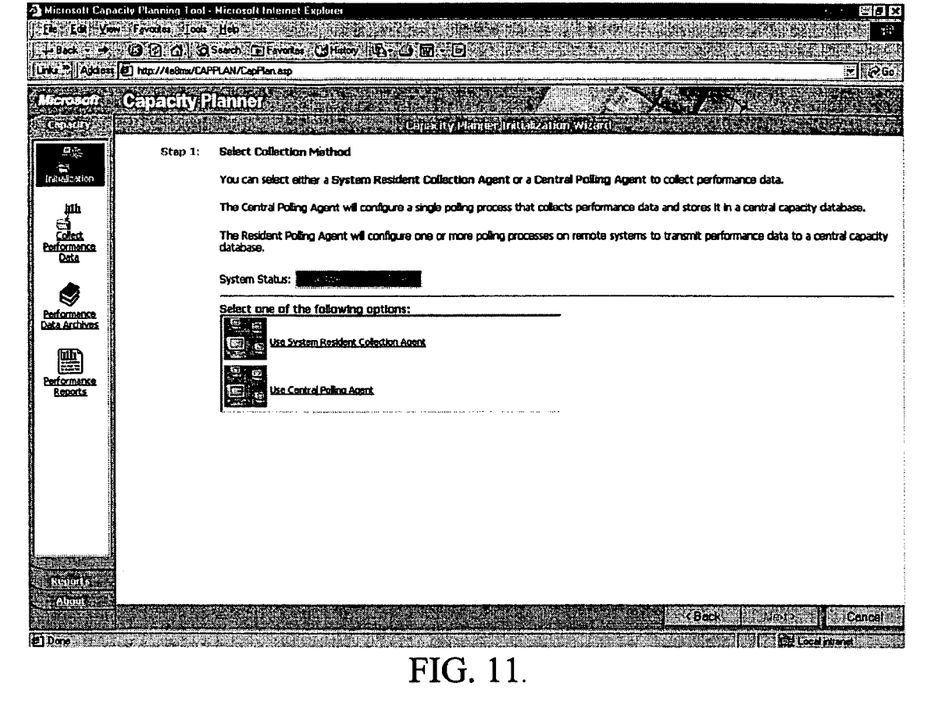
FIG. 11 is a screen shot of a graphical user interface for prompting the user to select from a plurality of available polling configurations in accordance with a preferred embodiment of the present invention.

A preferred embodiment of the present invention includes many features which are not found in conventional client management products, including the ability to select from multiple polling agent configurations. Upon initialization, the user console 94 retrieves and displays a set of menu entries which set forth the available polling agent configurations. As shown in FIG. 11, the user is prompted via a graphical user interface to select one of the two or more polling functions or modes for collecting the capacity planning data. Preferably, a central polling mode and a resident polling mode are both presented to the user. Another possible polling agent configuration would be a combined central and resident polling mode involving a central polling agent and one or more resident polling agents. This latter configuration may be useful for balancing management traffic over a network.

Upon receiving a user selection, the present invention implements at least one polling agent in accordance with the selected polling function. While the central polling function typically involves only a single polling agent, the resident polling function often involves multiple polling agents residing on separate machines or objects within the computer system. The present invention may designate one of the polling functions as a default selection (e.g., in the event no user selection is received within a preset time).

When a central polling configuration is selected, the central poller (CP) 98 communicates with the PIs over the respective links. The CP 98 communicates to the PIs 91 what type of data is required and when it should be communicated. Then, the CP 98 receives the data over the links from the PIs 91. However, under a resident polling configuration, the PIs 91 receive an initial polling function from the central manager 82 and determine the type of data required and when to send that data. Preferably, the resident PIs 91 send the data to the central database 96. Generally, the operation of a computer system in a single polling configuration (either central or resident) is conventional, and the details of such operation will not be described further herein except to the extent the present invention differs therefrom.

In addition to providing users with an initial choice between multiple polling configurations, the present invention advantageously provides the ability to change polling configurations. For example, a client management session in a central polling configuration can be converted to a resident polling configuration simply by reinitializing the client management session and selecting the other configuration. Moreover, the present invention also supports concurrent client management sessions, particularly involving one or more common machines, having different agent configurations.

The present invention preferably utilizes WBEM interface components to gather management data. The WBEM initiative is based on a set of management and Internet standard technologies developed to unify the management of enterprise computing environments, and it provides the ability to deliver a set of standard-based management tools leveraging emerging technologies such as CIM (Common Information Model) and XML (Extensible Markup Language). One example of a WBEM-compliant interface which can be utilized by the present invention is Microsoft Corporation's Windows Management Instrumentation (WMI). It is understood, however, that other interfaces may be used with the present invention. In any event, the polling agent issues to each client a management template, such as a policy, which identifies specific system objects and measurements to be taken in relation to those objects. Additionally, each client can receive multiple policies for different client management functions. Preferably, a policy engine in the operating system of the management machine 92 generates the policies for the system 80.

Figure 7:
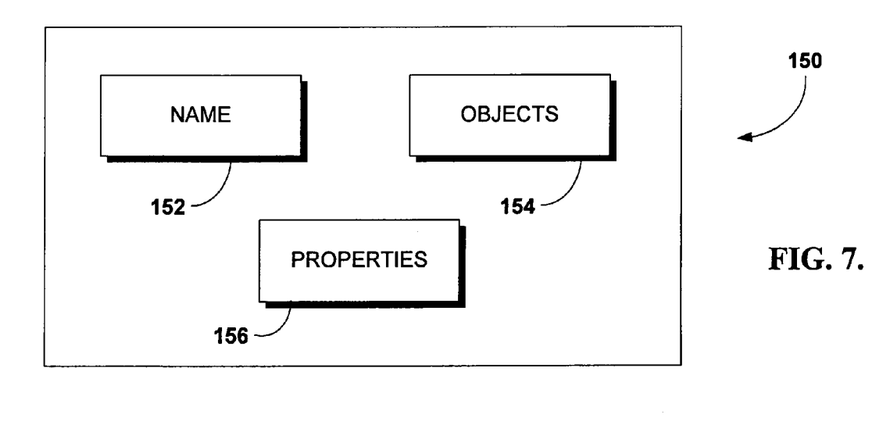
FIG. 7 is a block diagram illustrating the components of a policy issued in accordance with a preferred embodiment of the present invention.
Figure 8A:
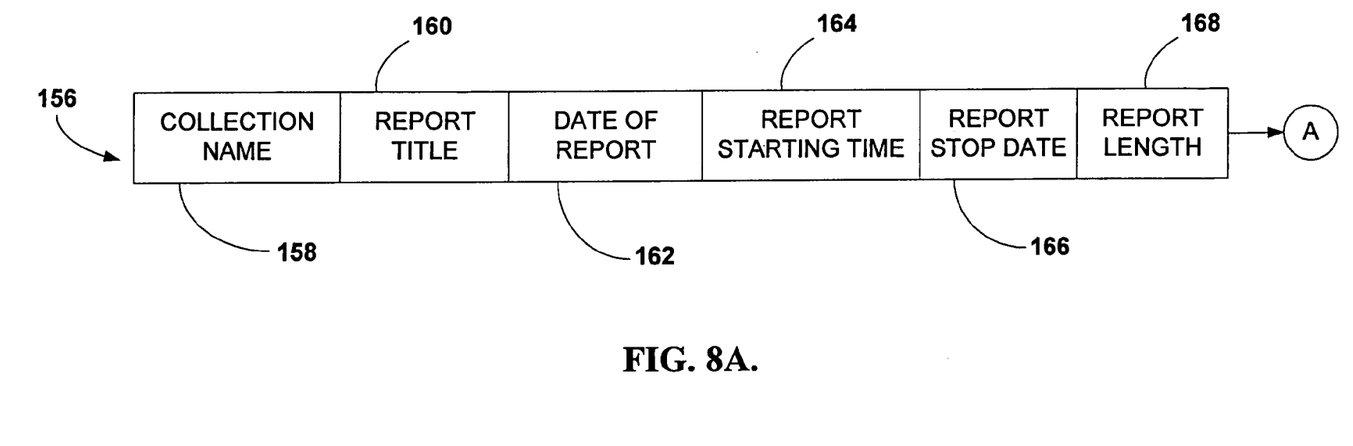
FIG. 8 is a block diagram of a data structure for the properties component of the policy of FIG. 7.
Figure 8B:
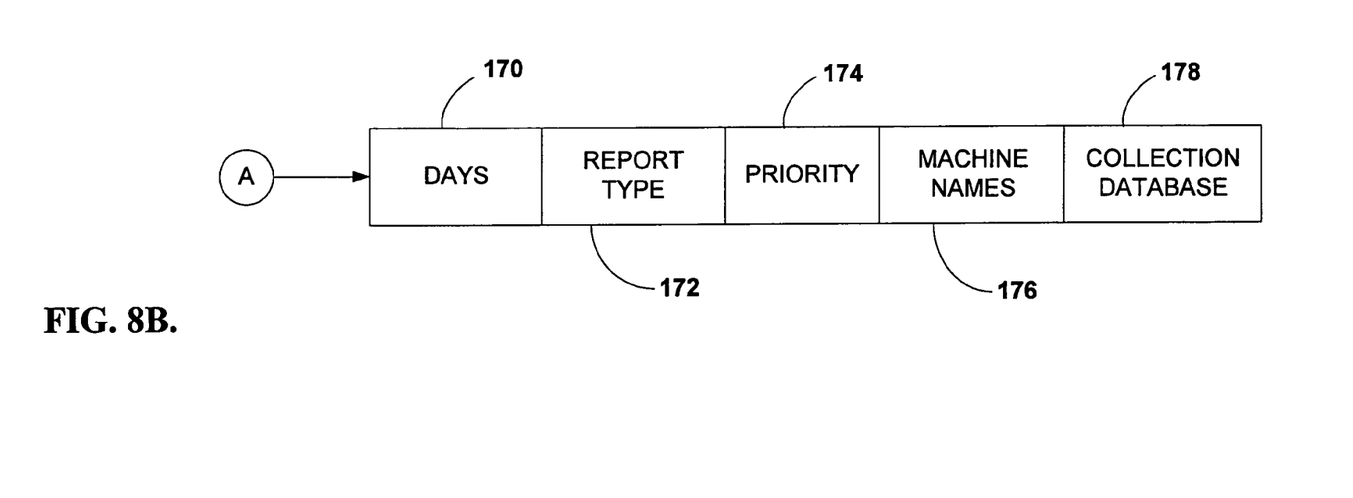

As shown in FIG. 7, a policy 150 preferably includes a policy name component 152, a component 154 which sets forth the objects of the policy, and a properties component 156. The properties component 156 of the policy 150 may be in the form of a data structure as set forth in FIGS. 8A–8B. Referring initially to FIG. 8A, the data structure 156 preferably includes a collection name field 158, a report title field 160, a report date field 162, a report starting time field 164, a report stop date field 166 and a report length field 168. Additionally, as shown in FIG. 8B, the data structure 156 includes a days of the week field 170, a report type field 172, a priority field 174, a machine names field 176 and a collection database field 178.

Figure 12:
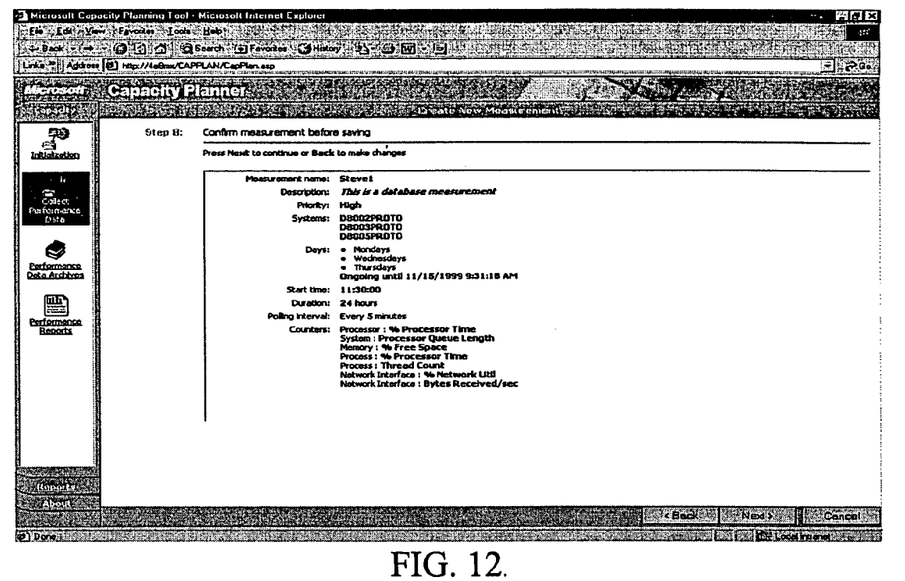
FIG. 12 is a screen shot of a graphical user interface for creating a new policy measurement in accordance with a preferred embodiment of the present invention.

Unlike conventional capacity planning products, a preferred embodiment of the present invention obtains capacity planning data by issuing capacity planning policies. A typical capacity planning policy might require machines such as servers 84–90 to measure CPU utilization, to measure queue lengths and to count I/O operations. This information is usually collected on an hourly or daily basis because it is typically not high priority information. FIG. 12 is illustrative of a preferred graphical user interface which allows a user to create and issue a new policy measurement to a client management machine.

Similarly, the present invention obtains performance monitoring data by issuing performance monitoring policies. As with capacity planning policies, performance monitoring policies identify specific system objects and measurements to be taken in relation to those objects. Performance monitoring policies typically differ from capacity planning policies, however, in that they seek different information for different purposes. As an example, one performance monitoring policy might require servers 84–90 (FIG. 2) to transmit data only if CPU utilization is greater than 50% for three minutes. If there are no violations of the policy, no data would be transmitted in response to that policy. However, the violation of a performance monitoring policy is usually of high importance and should be reported immediately.

Figure 6:
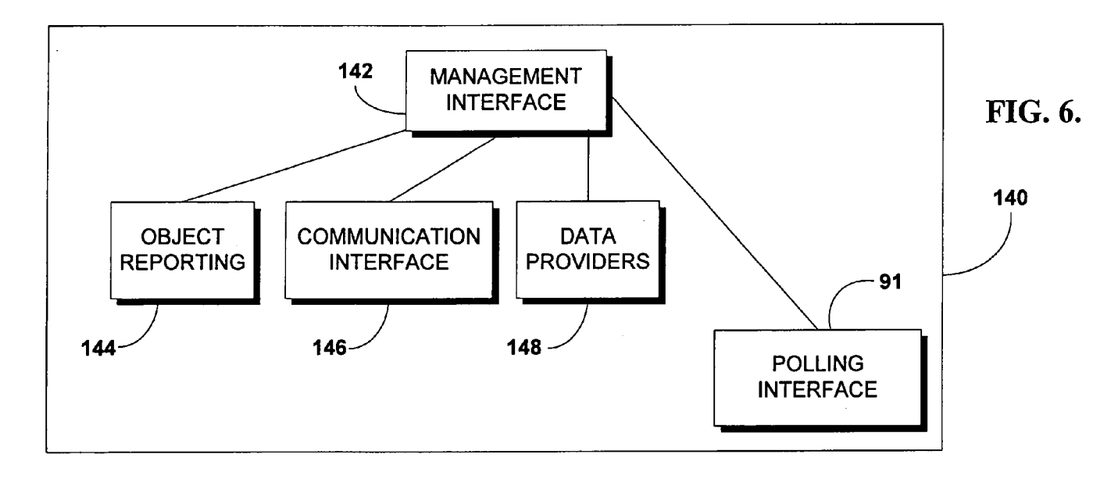
FIG. 6 is a block diagram illustrating the interaction between the polling interface and the management interface of a server suitable for use in connection with the present invention.

FIG. 6 illustrates some of the internal components of a client 140 suitable for use in connection with the present invention. Like the servers 84–90, the client 140 has a polling interface 91 which functions as a resident polling agent in a resident polling mode and which communicates with a central polling agent in a central polling mode. The client 140 also includes a management interface 142 which is connected to an object reporting component 144, a communication interface 146 and a plurality of data providers 148. The interface 142 is preferably the WMI interface of Microsoft Corporation's WINDOWS 2000 operating system, the object reporting component 144 is preferably a data handler, and the communication interface 146 is preferably a directory such as Microsoft Corporation's ACTIVE DIRECTORY. It is understood, however, that the present invention may be implemented with other operating systems (such as Unix) and other directory services (such as Novell Netware). Preferably, the data providers 150 include the counters and/or the trace logs commonly used to measure the performance of the client 140.

A preferred embodiment of the present invention also includes the ability to collect both capacity planning data and performance monitoring data in a single collection function. Conventionally, performance monitoring data is collected by a separate product, such as the PERFORMANCE MONITOR program implemented on Microsoft Corporation's WINDOWS NT or WINDOWS 2000 brand operating systems, or other performance monitoring programs, rather than a capacity planning product. By integrating the collection function of these two types of products, numerous efficiencies are achieved. For example, the volume of management traffic is reduced with the integrated capacity planner/performance monitor of the present invention. Additionally, only one polling agent/polling interface need be monitored by each client, thereby reducing the strain on system resources such as memory utilization, processor utilization and operator training.

Figure 5:
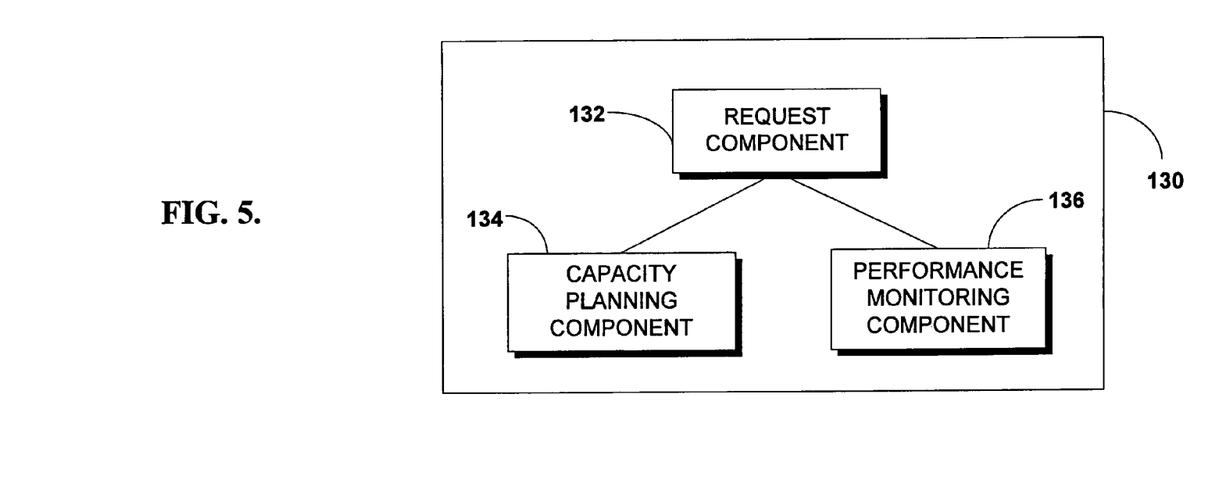
FIG. 5 is a block diagram illustrating the components of a preferred embodiment of the present invention in which the collection function of a capacity planner is integrated with the collection function of a performance monitor.

A management node 130 is shown in FIG. 5 for an integrated capacity planner/performance monitor. The node 130 includes a request component 132, a capacity planning component 134 and a performance monitoring component 136.

Although capacity planning data and performance monitoring data are typically not collected with the same frequency, there are a number of possible methods for integrating the collection of capacity planning and performance monitoring data. One method is to store the performance monitoring data (which is normally collected more frequently than capacity planning data) in the cache portion of the client's resident memory until the end of the next capacity planning interval, then both types of data are sent to their respective databases at that time. As discussed below in connection with FIG. 9, the cached performance monitoring data may be stored either in tables or in designated cache areas.

Another method for integrating the collection of capacity planning and performance monitoring data is to send the performance monitoring data to both the cache and the central database at each performance monitoring interval. In either case, the cached performance monitoring data could be averaged before being sent to the central database. Other collection methods could be tied to the occurrence of a policy violation, or to the occurrence of other events related to particular policies which are in effect.

Because the present invention allows multiple client management functions to be performed by the same components (e.g., the polling agents), the client management data processed by the components can take on different priorities for processing. For example, if the client management data is capacity planning data, which is typically collected on an hourly or daily basis, the need for the client manager to receive the data within a short time period is minimal. On the other hand, if the client management data is performance monitoring data, which is typically collected every few seconds, the need for the client manager to receive the data within a short time period is greatly increased. Conventional capacity planning products may unnecessarily congest network traffic by sending low priority capacity planning data during periods of high network utilization.

In another aspect of the present invention, the polling agents have the ability to limit the transmission of low priority data during times of high network utilization. For example, in a resident polling configuration, the polling agent at the client receives both capacity planning data and performance monitoring data from the client, and there are pre-established intervals for sending the data to the client manager. However, if the data to be transmitted is capacity planning data, the polling agent examines the current level of network utilization. If the network utilization is above a threshold level, the polling agent will not transmit the capacity planning data until the network utilization reaches an acceptable level or after a predetermined time period. In contrast, if the data is performance monitoring data, the polling agent transmits the higher priority data to the client manager regardless of the network utilization. Thus, the present invention allows the client management system to further reduce the strain on the network.

Figure 13:
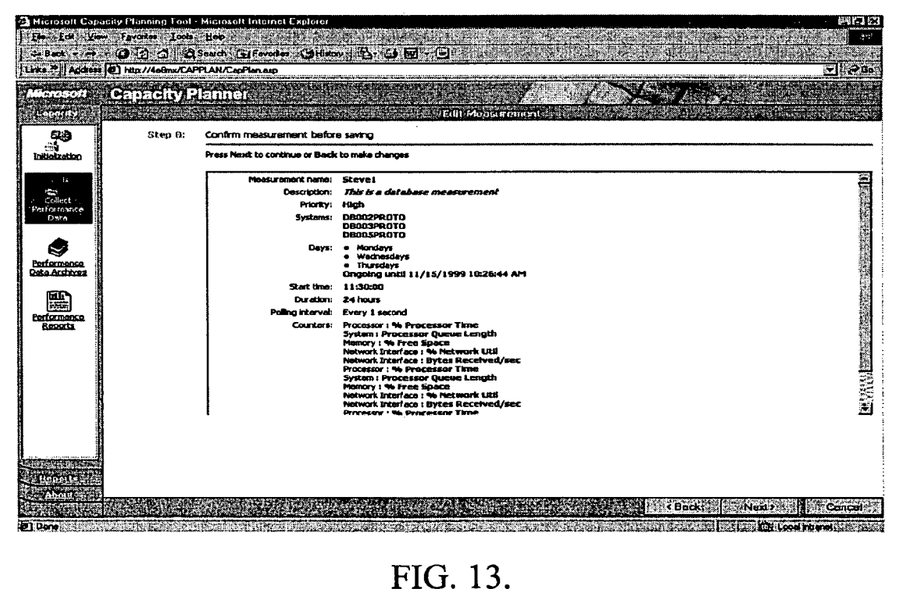
FIG. 13 is a screen shot of a graphical user interface for editing an active policy measurement in accordance with a preferred embodiment of the present invention.

The present invention also permits users to effectively alter an active measurement without deactivating it simply by changing the original measurement template, or policy, which calls for that measurement. Given that a relatively large number of measurements are normally taking place throughout a network for various purposes (e.g., operating system measurements), the active measurements specified in a policy are merely a subset of the available active measurements. Consequently, the policy can be changed without interrupting the act of taking the measurement. As an example, a policy may request notification whenever a particular machine's CPU utilization exceeds 50%. If the policy is later amended so that notification occurs only when CPU utilization exceeds 40% for five minutes, the measurement itself is not interrupted. Similarly, the policy could be amended by deleting any reference to that machine's CPU utilization, but the measurement is still not deactivated. Thereafter, the policy might be amended to once again request notification if the machine's CPU utilization exceeds a certain threshold. Consequently, the underlying measurement is not affected by sending new policies or by changing existing policies. With reference to FIG. 13, a user edits an active measurement using the same or similar graphical user interface. Conventional capacity planners do not provide this functionality.

Figure 9:
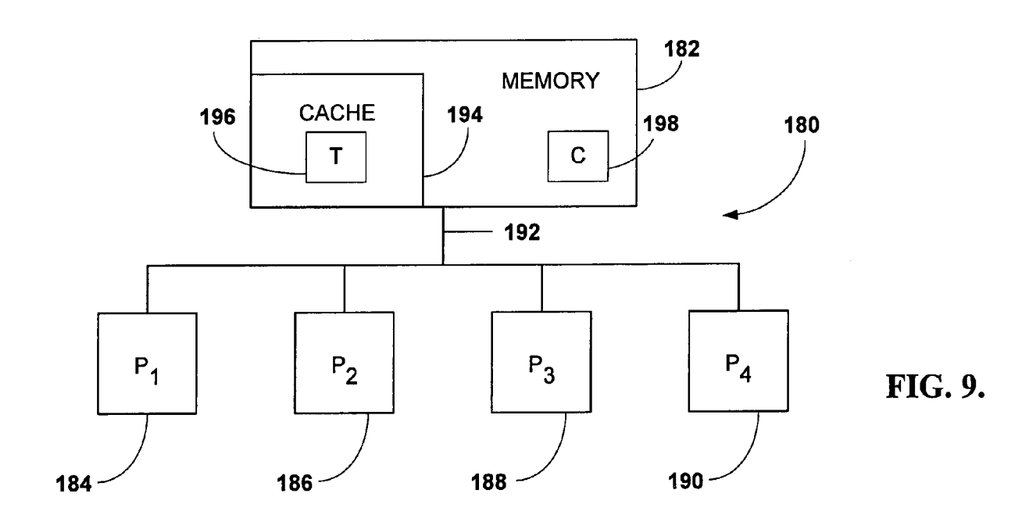
FIG. 9 is a block diagram of an exemplary computer system having a cache for storing client performance data locally in accordance with a preferred embodiment of the present invention.

Another feature of the present invention involves caching performance data at the client location and averaging it over a selected time period to obtain more accurate capacity planning data. An exemplary computer system 180 is shown in FIG. 9 and includes a client memory 182 coupled with a plurality of processors 184, 186, 188 and 190 over a bus 192. It is understood, however, that the present invention could be implemented on any computer system having a memory and one or more processors. The client memory 182 shown in FIG. 9 includes a cache 194, which contains one or more tables 196, and a collection agent 198.

In accordance with a preferred embodiment of the present invention, performance data is collected by the agent 198 at selected intervals and stored in the cache 194 for a period of time. Typically, performance monitoring data is collected at relatively short intervals (e.g., a few seconds) and capacity planning data is collected at relative long intervals (e.g., hourly or daily). Under the present invention, the performance data is preferably cached for a time period (e.g., an hour) which is less than the normal collection interval for capacity planning yet greater than the normal collection interval for performance monitoring. Then, the cached data is averaged over that time period and forwarded to a central database. The averaged performance data provides a substantially higher number of data points than is typical for capacity planning data. For example, if the collection interval for performance monitoring is three seconds and that data is averaged hourly, an hourly average would be based on 1200 data points. By contrast, an hourly collection interval for capacity planning produces data based on a single data point. Those skilled in the art would appreciate that the specific intervals discussed above are merely exemplary and that the actual intervals are configurable.

With continued reference to FIG. 9, the caching feature of the present invention may be implemented in at least two ways. The performance data collected by the agent 198 may be written to an area in the cache 194 defined to exclusively contain the management data (i.e., an area other than a table). Alternatively, when blocks of the cache 194 cannot be assigned solely to one specific function, the cache collection process can be simulated by writing the performance data to one or more tables 196 stored in variable locations in the cache. The cache need not contain any tables if the data is being written to a cache area. Those skilled in the art will understand that one or more clients may instead forward the performance data to a remote cache (e.g., the management machine 92 in FIG. 2) in which the data is stored and averaged and then forwarded to a central collection location (e.g., the database 96 of FIG. 2).

Figure 14:
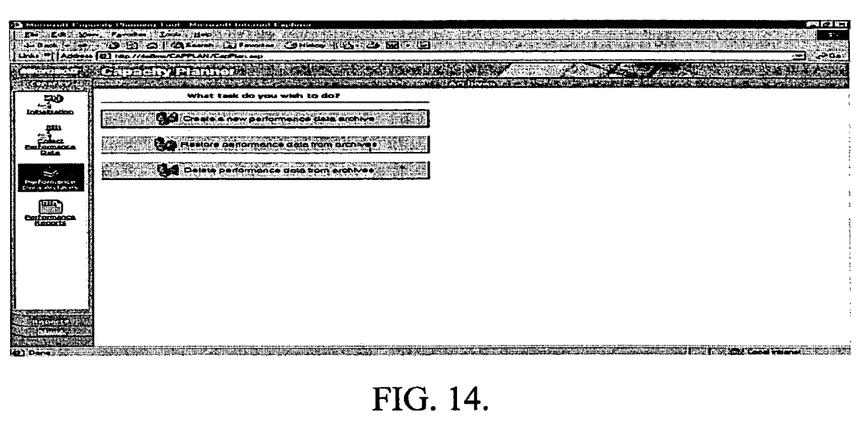
FIG. 14 is a screen shot of a graphical user interface for archiving one or more previously collected management data files in accordance with a preferred embodiment of the present invention.
Figure 15:
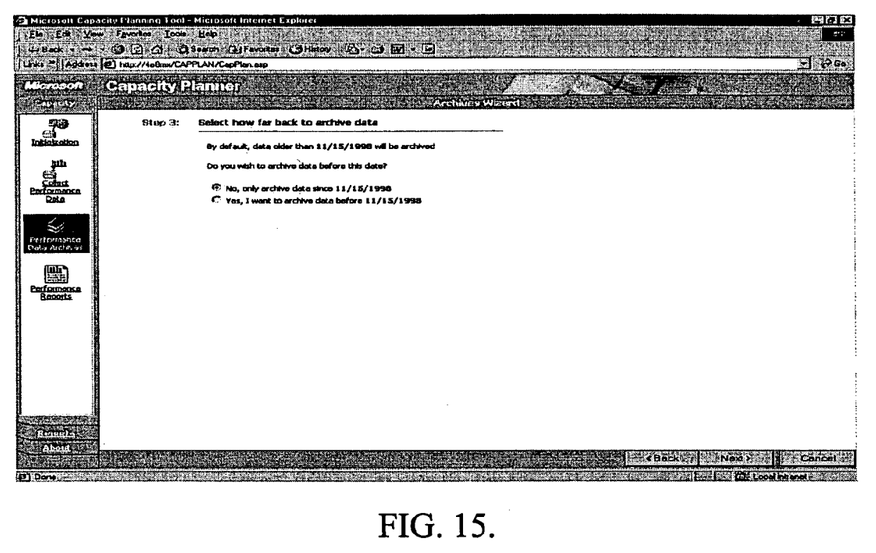
FIGS. 15 and 16 are screen shots of a graphical user interface for creating new performance archives in accordance with a preferred embodiment of the present invention.
Figure 16:
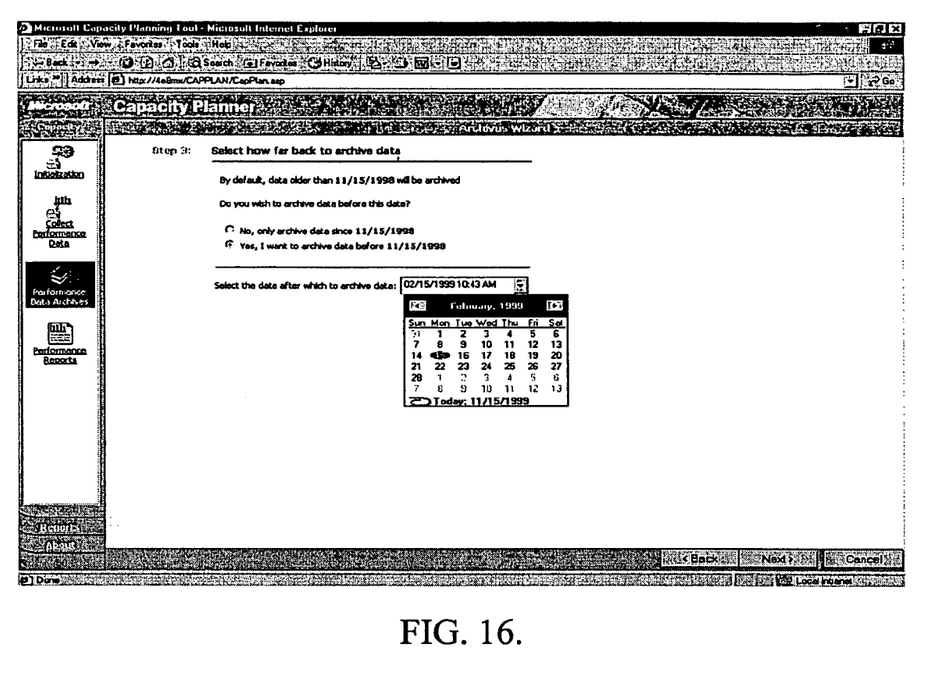

Importantly, the present invention provides an archiving function within the client management tool, thereby eliminating the time-consuming and tedious tasks of exiting and re-entering the capacity planner simply to archive. Consequently, the user interface is simplified and incorporates the archiving function so that a database specialist is not required for routine activities. FIGS. 14–16 are screen shots illustrative of graphical user interfaces for archiving data within the client management tool. As illustrated in FIG. 14, the user may be given the opportunity to create a new performance archive, to restore archived data, or to delete archived files. With reference to FIGS. 15–16, a graphical user interface allows the user to designate the amount of data archived (e.g., all data within a one year block).

Figure 10:
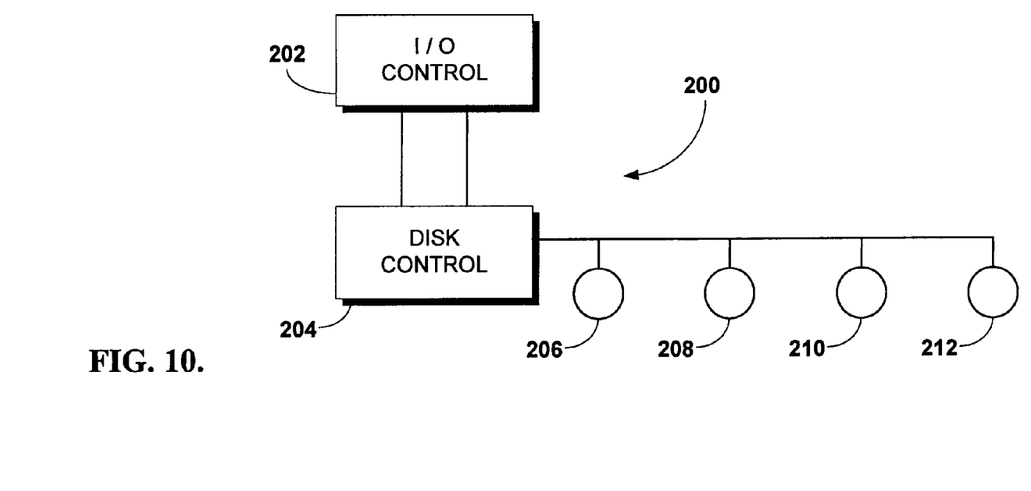
FIG. 10 is a block diagram illustrating an exemplary computer system for archiving performance data in accordance with a preferred embodiment of the present invention.

Referring next to FIG. 10, an exemplary computer system 200 is shown which includes an I/O control 202 coupled to a disk control 204 via I/O channels. A plurality of disk drives 206, 208, 210 and 212 are connected to the disk control 204 over a bus. Although four disks 206–210 are shown in FIG. 10, the system 200 could include any number of disks for the purposes of the present invention. Preferably, the disk configuration of FIG. 10 is utilized to archive performance data. For example, a single performance archive file may be stored only on an individual disk, such as the disk 206. Additionally, a mirror copy of the same performance archive file could be stored on another of the disks, such as the disk 212 for redundancy. Alternatively, the performance archive file may be broken up into two or more components and stored separately. For example, the performance archive file may be broken up into four components such that each of the disks 206–212 contains one of the components.

A further feature of the present invention involves reading from and/or converting pre-existing management data databases. Preferably, under the present invention, a standardized schema for storing management data, regardless of the management tool or the provider to facilitate future client management, is created utilizing a preferred three-table configuration, such as Microsoft Corporation's SQL Server Database format. Accordingly, all future data collected and stored under the standardized schema will be readable from a variety of management tools. However, previously collected data, stored in a format different from the standardized format, remains unreadable and/or prevents a manager from adding new data stored under the standardized format. Thus, the present invention utilizes two embodiments for reading and/or converting pre-existing management database files.

In a first embodiment, the present invention utilizes a filter, such as SQL Server Data Transformation Service (DTS), which can accept various pre-existing formats and automatically convert them to a standardized format. The filter accepts pre-existing database files saved in one or more pre-existing formats, and converts them to the standardized schema. For example, some conventional client management tools collect and store client management data in a spreadsheet format, such as Microsoft Corporation's EXCEL spreadsheet format, with pre-defined data column headings. Accordingly, the filter, configured to accept the pre-defined data formats, reads the EXCEL file and converts it to the standardized format. As would be readily understood, alternative types of pre-existing database file configurations acceptable by the filter are considered to be within the scope of the present invention.

Figure 17:
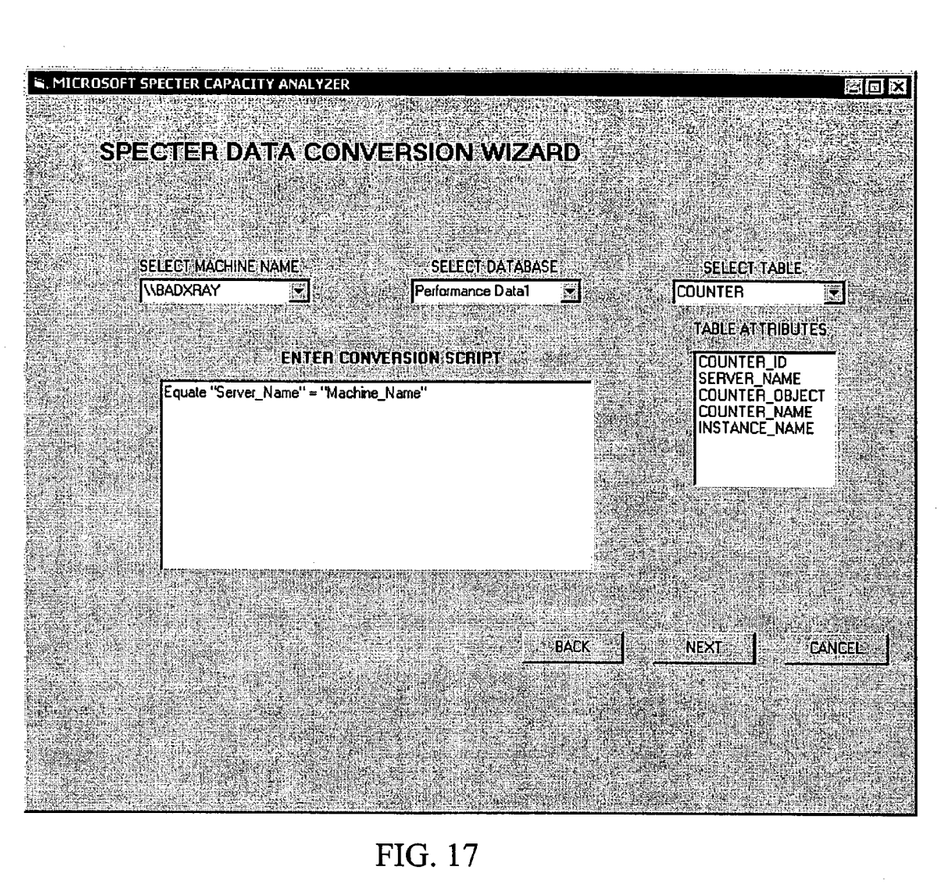
FIG. 17 is a screen shot of a graphical user interface for entering a scripted correlation for a translation engine in accordance with a preferred embodiment of the present invention.

In a second embodiment, the present invention includes a translation engine on the management tool that utilizes a scriptable language, such as Microsoft VB Scripts, allowing a user to specify a correlation of the schema utilized by the pre-existing database file to the standardized schema. In this embodiment, the present invention does not convert the database file, but rather utilizes the scripted correlation to locate data on the pre-existing database file. For example, a first column in the pre-existing database file utilizes a "Machine Name" field to identify the server. Under the standardized schema, however, a corresponding field is called "ServerName." Accordingly, to allow the pre-existing database file to be read, the user indicates via the scriptable language that these fields are equivalent and then the management tool would know to look under the "Machine Name" field when prompted to recall, by a management process, the data in the "ServerName" field. FIG. 17 is a screen shot illustrative of a preferred graphical user interface allowing a user to enter correlation scripts in accordance with the present invention. As would be readily understood, alternative graphical user interfaces are considered to be within the scope of the present invention.

The following script is illustrative of a user input to a translation engine in accordance with the present invention.
 SELECT * from PERFTABLE WHERE MACHINE_NAME="DB00" OR MEASUREMENT_NAME="DATABASE_ MACHINE_MEASUREMENT"

In this example, the script indicates that the translation engine should select from the database file named "PERFTABLE" all data having the properties under column heading "MACHINE_NAME" of "DB00" or MEASUREMENT_NAME of "DATABASE_MACHINE_MEASUREMENT." As would be understood, alternative input methods are considered to be within the scope of the present invention.

In yet another feature, the present invention includes the ability to link into and expand existing database files. Some database files, such as log files, utilize an end-of-file (EOF) indicator to signal the end of the measurement data file. Generally, these log files are designated for a dedicated purpose (e.g., capacity planning or performance monitoring), so it is generally not regarded as a deficiency that the management tool database file cannot be expanded. However, because the present invention can utilize collected management data for both performance monitoring and capacity planning, the present invention expands a file as the more management data is collected and utilized for various purposes.

For example, as performance monitoring data is being written to a log file, it is utilized by the performance monitoring component of the present invention. Upon completion of the specific collection process, an EOF indicator is attached to the end of the file to indicate that no more management data is to be read. However, as more performance monitoring data is collected, it is preferable to add it to the same log file, as the data will also be used for capacity planning purposes. The present invention accepts the incoming data and relocates the EOF of the file to the end of the new data. Accordingly, the log file is expanded.

In accordance with other aspects of the present invention, the expansion of existing log files preferably works with log files formatted in a standardized schema. Accordingly, new management data being written to the log file preferably is organized according to the standardized schema. To maintain consistency in data, the management data in the database file is preferably stored according to the schema to facilitate the addition of the new data.

Figure 4:
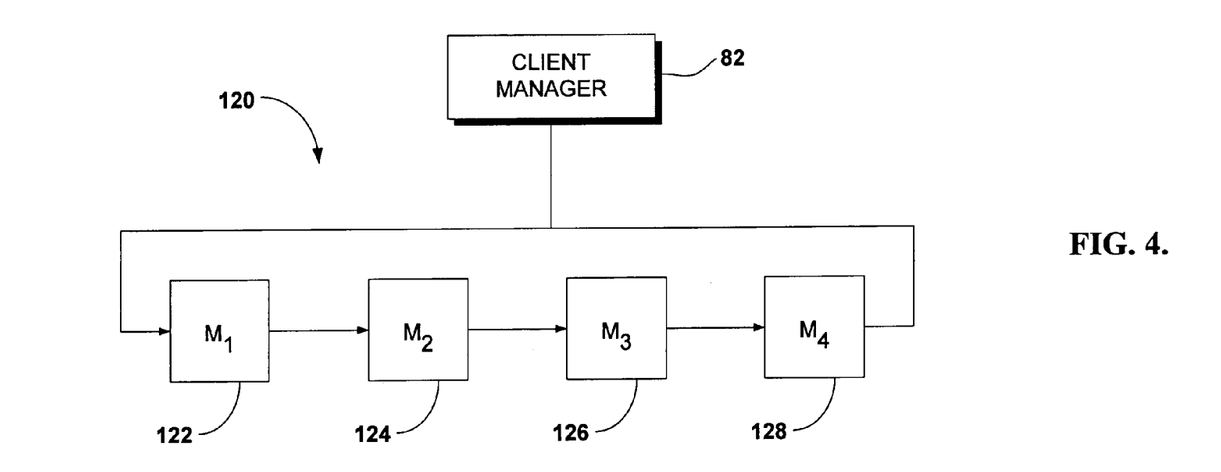
FIG. 4 is a block diagram of a service chain suitable for use in connection with the present invention.

FIG. 4 illustrates an application of the present invention in an exemplary service chain 120 for performing a service transaction. The service chain 120 includes a plurality of service chain components 122, 124, 126 and 128. The client manager 82 is in communication with the service chain 120 for monitoring the performance of its components 122–128. While the service chain shown in FIG. 4 is depicted as a series of machines M1 through M4, the service chain 120 could consist of any combination of hardware and/or software components associated with the service transaction in question.

Because the present invention preferably implements both a capacity planning function and a performance monitoring function, the client manager 82 may issue to the components 122–128 policies which are directed to either function. For example, a first policy may implement a capacity planning function to estimate system performance and determine whether the system is likely to violate a service level agreement (SLA). A second policy may implement a performance monitoring function by detecting in real-time any occurrence of a threshold being exceeded. Thus, the client management product of the present invention allows for a more complete management of service chains than a conventional product.

Alternative embodiments of the present invention will become apparent to those skilled in the art to which it pertains upon review of the specification, including the drawing figures. The various computer systems and components shown in FIGS. 1–17 and described in the specification are merely exemplary of those suitable for use in connection with the present invention. Accordingly, the scope of the present invention is defined by the appended claims rather than the foregoing description.

We claim:

1. A method in a computer system for measuring one or more client attributes, the method comprising:
   initiating a measurement of client attributes from at least one associated client, the client attributes comprising at least one of performance monitoring data and capacity planning data;
   establishing a subset of the client attributes to be collected from the at least one associated client;
   collecting the subset of client attributes from the at least one associated client;
   without terminating the measurement of the client attributes, establishing a modified subset of the client attributes to be collected from the at least one associated client, the modified subset being established without requiring a polling action to the at least one associated client; and
   collecting the modified subset of client attributes from the at least one associated client.

2. The method as recited in claim 1, wherein the step of collecting the subset of client attributes includes issuing at least one management data template corresponding to the subset of client attributes.

3. The method as recited in claim 1, wherein the step of collecting the modified subset of client attributes includes issuing at least one management data template corresponding to the modified subset of client attributes.

4. The method as recited in claim 1, wherein the collecting steps include collecting data from one or more client counters.

5. The method as recited in claim 1, wherein the collecting steps include collecting data from one or more client trace logs.

6. A computer-readable medium having computer-executable instructions for performing the steps recited in claim 1.

7. A computer system having a processor, a memory and an operating environment, the computer system operable to perform the steps recited in claim 1.

8. A method of communicating between a monitor process and a client process, the method comprising:
   issuing, by the monitor process, a first set of data indicative of client attributes to be measured in at least one associated client, the client attributes comprising at least one of performance monitoring data and capacity planning data;
   receiving, by the client process, the first set of data;
   measuring, by the client process, attributes responsive to the first set of data in the at least one associated client;
   issuing, by the monitor process, a second set of data indicative of a replacement set of client attributes to be measured from the at least one associated client, the replacement set of client attributes being generated without requiring a polling action to the at least one associated client;
   receiving, by the client process, the second set of data; and
   measuring, by the client process, attributes responsive to the second set of data in the at least one associated client.

9. The method as recited in claim 8, wherein the first and second sets of data include at least one client management template corresponding to the client attributes.

10. The method as recited in claim 8, wherein the measuring steps include monitoring one or more client counters.

11. The method as recited in claim 8, wherein the measuring steps include monitoring one or more client trace logs.

12. A computer-readable medium having computer-executable instructions for performing the steps recited in claim 8.

13. A computer system having a processor, a memory and an operating environment, the computer system operable to perform the steps recited in claim 8.

14. A method for editing the measurement of one or more client process attributes, the method comprising:
   generating a first set of client process attributes to be collected from at least one associated client, the first set of client process attributes comprising at least one of performance monitoring data and capacity planning data;
   transmitting the first set of client attributes to the client process;
   generating a second set of client attributes to be collected from the at least one associated client to replace the first set of client attributes, the second set of client process attributes comprising at least one of performance monitoring data and capacity planning data, the second set of client attributes being generated without requiring a polling action to the at least one associated client; and
   seamlessly replacing the first set of client attributes with the second set of client attributes for measuring client process attributes in the at least one associated client.

15. The method as recited in claim 14, wherein the steps of generating the first and second set of client attributes include generating at least one client management template corresponding to the client attributes.

16. A computer-readable medium having computer-executable instructions for performing the steps recited in claim 14.

17. A computer system having a processor, a memory and an operating environment, the computer system operable to perform the steps recited in claim 14.

18. The method as recited in claim 1, wherein establishing the modified subset of the client attributes deletes one or more client attribute from the subset of client attributes but measurements associated with the deleted one or more client attribute are collected.

19. The method as recited in claim 1, wherein the modified subset of the client attributes includes client attributes having different priority levels.

* * * * *